(12) United States Patent
Annamalai

(10) Patent No.: US 10,609,526 B2
(45) Date of Patent: Mar. 31, 2020

(54) REAL-TIME LOCATION SYSTEM, DEVICE AND METHODS

(71) Applicant: CenTrak, Inc., Newtown, PA (US)

(72) Inventor: Karuppiah Annamalai, Newtown, PA (US)

(73) Assignee: CenTrak, Inc., Newtown, PA (US)

(*) Notice: Subject to any disclaimer, the term of this patent is extended or adjusted under 35 U.S.C. 154(b) by 0 days.

(21) Appl. No.: 15/868,101

(22) Filed: Jan. 11, 2018

(65) Prior Publication Data

US 2018/0199171 A1    Jul. 12, 2018

Related U.S. Application Data

(60) Provisional application No. 62/498,967, filed on Jan. 11, 2017.

(51) Int. Cl.
| | |
|---|---|
| *H04W 4/35* | (2018.01) |
| *H04W 4/02* | (2018.01) |
| *G01S 5/02* | (2010.01) |
| *G01S 1/04* | (2006.01) |
| *G01S 1/02* | (2010.01) |
| *G01S 5/14* | (2006.01) |
| *G01S 1/74* | (2006.01) |
| *G01S 1/70* | (2006.01) |

(52) U.S. Cl.
CPC ............ *H04W 4/35* (2018.02); *G01S 1/042* (2013.01); *G01S 5/0252* (2013.01); *G01S 5/0257* (2013.01); *G01S 5/0263* (2013.01); *H04W 4/02* (2013.01); *G01S 1/02* (2013.01); *G01S 1/70* (2013.01); *G01S 1/74* (2013.01); *G01S 5/14* (2013.01)

(58) Field of Classification Search
CPC .............................. H04W 8/005; H04W 24/08
USPC ............................................ 455/456.1–456.6
See application file for complete search history.

(56) References Cited

U.S. PATENT DOCUMENTS 9,843,911 B2 * 12/2017 Barnes .................... H04W 4/90
9,911,020 B1 * 3/2018 Liu ......................... G01S 13/74

* cited by examiner

*Primary Examiner* — Joshua L Schwartz
(74) *Attorney, Agent, or Firm* — Kaplan Breyer Schwarz, LLP

(57) ABSTRACT

A real-time location system including a backbone communication network having a plurality of network access point devices and a real-time location system server, a plurality of monitor devices where each monitor device being located at a location around a facility, each of the plurality of monitor devices being configured to transmit a unique monitor identification code using a secondary transmission technology, each of the monitor identifications codes being mapped to a single location in the facility at which a monitor device is located, each of the monitor devices further being configured to transmit an RF beacon using a first RF protocol, and at least one tag being configured to receive, detect and retransmit the monitor identification code back to at least one of the plurality of monitor devices using a second RF protocol.

4 Claims, 11 Drawing Sheets

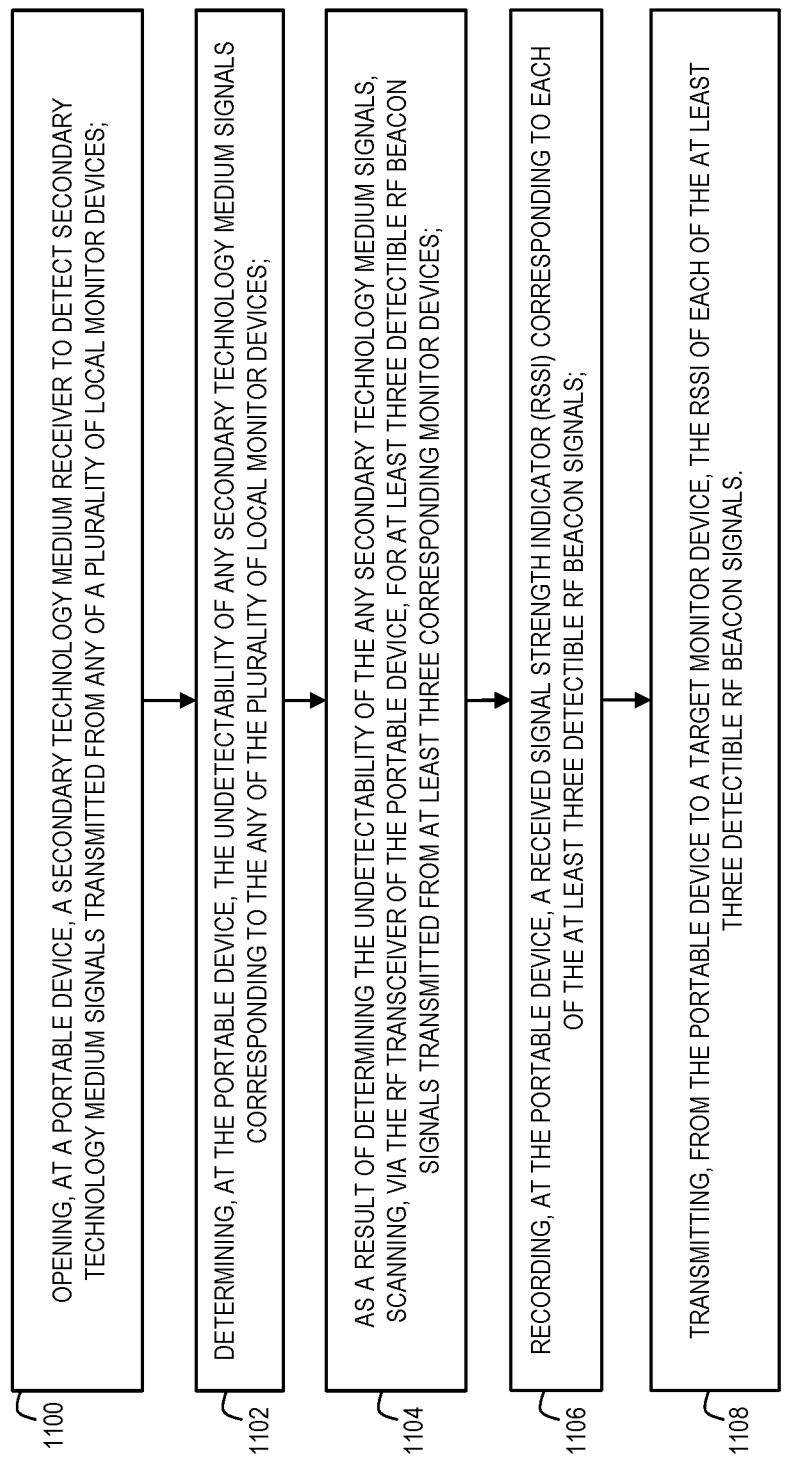

REAL-TIME LOCATION SYSTEM, DEVICE AND METHODS

RELATED APPLICATION INFORMATION

This application also claims priority to, and incorporates fully by reference, U.S. Provisional Patent Application No. 62/498,967. This application also incorporates by reference U.S. Pat. No. 8,604,909, entitled, "Methods and Systems for Synchronized Ultrasonic Real Time Location."

FIELD OF THE INVENTION

The embodiments presented herein relate to real-time location systems that locate and identify portable tags in a facility. In particular, the invention relates to improvements in systemic approaches to merge the benefits of WiFi (802.11-type) transmission, low energy and proprietary Radio Frequency (RF) transmissions, and secondary technology medium transmissions (e.g.; infra-red or ultrasound) into a single system.

BACKGROUND

Real-time location (RTL) systems have become popular in recent years. Some conventional RTL systems typically use radio frequency (RF) transmissions between a portable tag attached to an asset and plural fixed points to determine location via a trilateration method. Other known RTL systems include fix mounted infrared (IR) or ultrasonic (US) base stations (a/k/a "monitors") that transmit an ID code using a secondary technology such as infrared (IR) or Ultrasound (US) signals. The IR or US signal includes a respective monitor device ID. Upon reception of a monitor device ID, the portable tag transmits both the portable tag ID and the received monitor device ID ("location data") to a network access point, for example, by wireless RF transmission such as Wifi 802.11. The access point forwards the received information to a server that uses the monitor device ID and the portable tag ID to determine the location of an asset to which the portable is attached.

In this manner, the position of the portable tag may be displayed as the position of the IR monitor device. Such a system is described, for example, in the incorporated U.S. Pat. No. 8,604,909.

Present day available wireless protocols include Wifi (802.11-type) and alternate RF technology. Alternate RF technology refers herein to communication technology that is not WiFi (802.11-type) based, but which utilizes other RF protocols and/or standards (including, but not limited to: Bluetooth Low Energy (BLE) and Bluetooth, Zigbee, and ZWave), or one of the many non-standardized and available protocols that operate, for example, at 433 or 900 MHz.

Wifi is often preferred because, among other reasons, it allows use of a facility's existing infrastructure when the RTL system is installed. By having the portable tag transmit the location data to the facility's existing Wifi network using the existing Wifi protocol, installation of an entirely new network infrastructure for the sole purpose of implementing the RTL system is avoided.

However, alternate RF technologies are often better suited for RTL applications. For example, such alternate RF technologies consume less power, and allow for smaller tags and longer battery life. Therefore, there exists a need for an RTL system that obtains the benefits of Wifi, so that a facility's existing infrastructure can be used, but which also obtains the benefits of alternate RF technologies.

SUMMARY

In an exemplary embodiment, a relatively longer range and higher power RF signal and protocol (e.g.; Wifi or a variant thereof, such as CCX) is used for communications between a secondary technology monitor and network access points. This allows the facility's existing Wifi infrastructure to be utilized. However, communications from the monitor to the portable tag is implemented in a first direction using a secondary technology such as US or IR, and in a second direction using an alternate RF technology.

For example, rather than the portable tag transmitting its location data to a network access point, it transmits the location data back to a monitor, using an alternate RF technology. The monitor may then forward the location data to network access point using a Wifi protocol. The monitor thus acts as a bridge between the portable tag and the existing network infrastructure, thereby allowing the tag to transmit using a lower power, more RTL-optimized, alternate RF technology for wireless transmission, while also permitting a more standardized Wifi type protocol (e.g.; 802.11) to be used by the monitor to interface to the network access point of the facility's existing network infrastructure.

The portable tag may also sometimes be located in an area such that it cannot receive the monitor ID from the secondary technology monitor. To locate assets in such a situation, an embodiment of the present invention provides monitors that also transmit RF beacons containing the monitor ID and optionally a time stamp. If the tag cannot locate the secondary technology, it scans the air for the RF beacons, selects a monitor from which at least one of the periodic beacons it is receiving originates, and transmits a measurement signal back to that monitor. The measurement signal itself may be, for example, RSSI data of plural received beacons as measured by the portable tag. The measurement data is then used to calculate the location of the portable tag, either by the monitor or by the server to which the monitor sends the measurement signal.

The RF beacons may use Wifi or similar technology, or may use an alternate RF technology (e.g.; BLE beacons) or even another type of RF protocol and frequency.

The selection of which monitor to which the measurement signal is transmitted back may be made by choosing the monitor from which the first, or the strongest, beacon received at the tag originates, or by suing any other suitable alternative selection criteria.

Generally, the portable tag may transmit back to the selected monitor plural signal strengths from plural beacons, or other information from which distances can be derived. In this case, location can be derived via trilateration methodologies known in the art.

A monitor device usable in one or more of the above embodiments includes a central processor, a monitor device memory containing a unique monitor device identification (ID) value, (i.e.; monitor ID), a monitor device communication bus in communication with the monitor device central processor and the monitor device memory and further in communication with a network access point device transceiver, a monitor device Radio Frequency (RF) transceiver, a beacon generator, and a secondary technology medium transmitter.

BRIEF DESCRIPTION OF THE SEVERAL VIEWS OF THE DRAWINGS

The embodiments of the invention will be better understood from the following detailed description with reference to the drawings, which are not necessarily drawing to scale and in which:

FIG. 11 illustrates a logic flow chart of the second embodiment of a method of communicating between the devices of the hybrid real-time location system from FIGS. 7-10.

DETAILED DESCRIPTION

Figure 1:
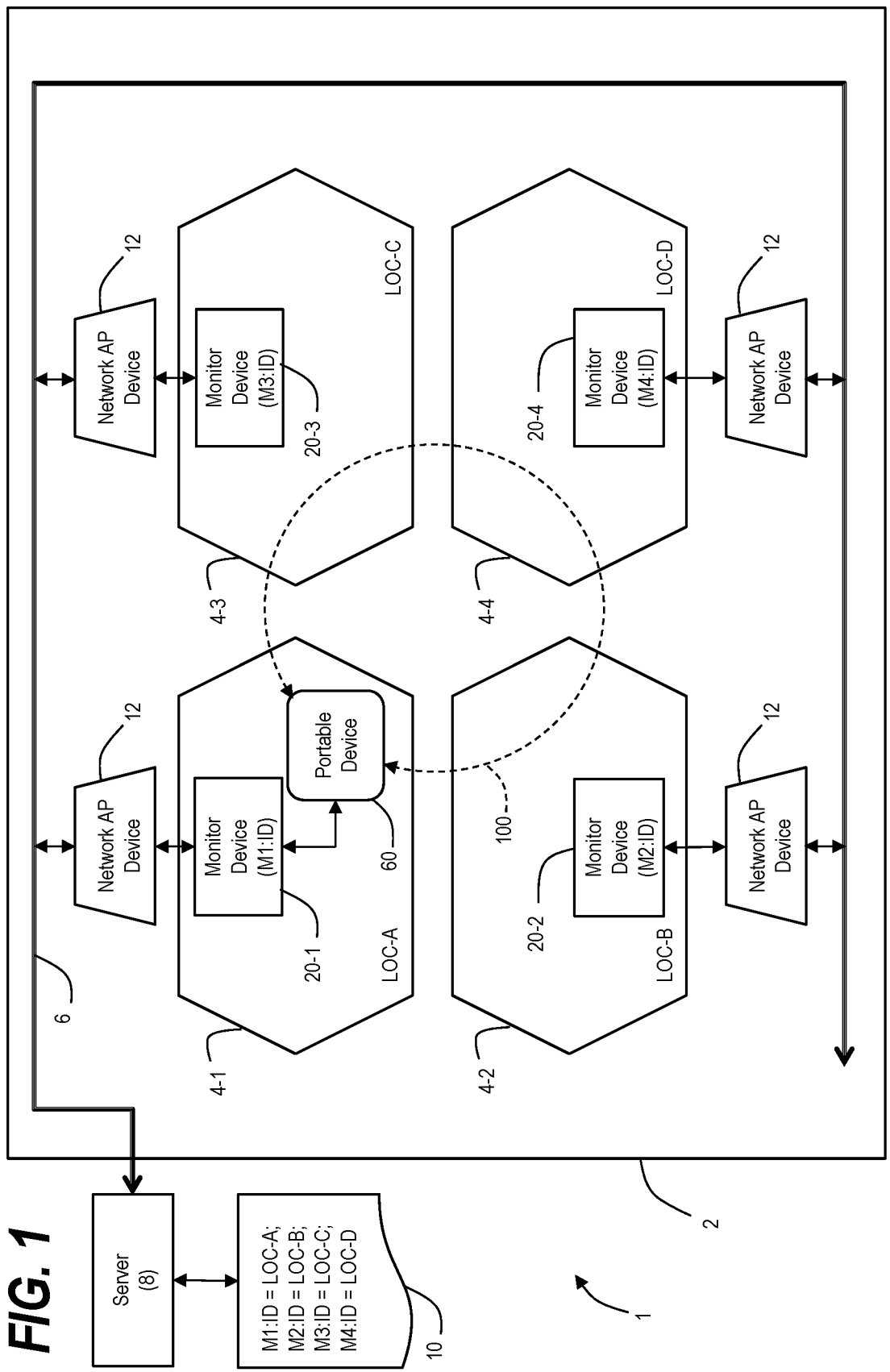
FIG. 1 illustrates a schematic diagram of a hybrid real-time location system.

Referring now to FIG. 1, a schematic diagram is shown of a real-time location system (1) for determining a location and an identity of a portable tag (60) in a particular location (4-1) within a larger facility (2). The real-time location system (1) may be adapted to be implemented on multiple facilities (2), (not shown), where each facility (2) may include a plurality of particular locations (4-1, 4-2, 4-3 and 4-4), where each particular location is monitored by a respective particular monitor device (20-1, 20-2, 20-3 and 20-4). Each of the monitor devices (20) communicates via Radio Frequency (RF) with at least one respective network Access Point (AP) device (12) that in turn communicates with a real-time location system server (8) via a backbone communication network (6).

One or more portable tags (60) may move (100) within the facility (2) between various particular locations (4-1, 4-2, 4-3 and 4-4). For example, FIG. 1 illustrates the portable tag (60) coming within the communication range of the particular monitor device (20-1) within a particular location (4-1), also identified as "LOC-A," for illustrative purposes here. The portable tag (60) receives the monitor ID from the particular monitor device (20-1) and transmits back to the monitor device the monitor device ID and the portable tag ID (hereafter, "location data"). The monitor (20-1) then transmits the location data to a network AP device (12) that communicates with the real-time location system server (8) via the backbone communication network (6). When the communication with the location data is received at the real-time location system server (8), the server (8) utilizes a real-time location system server table (10) to associate the particular received embedded monitor identifier (M1:ID) with a pre-stored location (LOC-A) associated with the respective particular monitor device (20-1). As a result, the real-time location system server (8) is able to determine that the portable tag (60) is within the proximity of the particular location (4-1) designated as "LOC-A."

The real-time location system server (8), in the same way, may associate any other monitor device identifier, (for example, identifiers M2:ID, M3:ID and M4:ID) of respective particular monitor devices, (20-2, 20-3 and 20-4), with physical locations (LOC-B, LOC-C, LOC-D) stored in the real-time location system server table (10).

In an exemplary embodiment, the communications from the monitor to the portable tag 60 may be accomplished using a secondary technology, such as IR or US signaling. The communications from the portable tag 60 to the monitor device 20-1, such as the communication of the location data, is accomplished using, for example, BLE, Bluetooth, Zigbee, or other alternate RF technology. The communications from the monitor to the network access point 12 is accomplished using Wifi or, more generally, an 802.11 compliant protocol.

In a more general exemplary embodiment, the communication from the monitor to the network access point may be implemented using a relatively higher power longer range RF technology than the communications from the portable device to the monitor device, which uses an alternate RF technology that has relatively shorter range and lower power when compared with the RF technology utilized to communicate between the monitors and the access points.

In another alternative embodiment, the tag may transmit back to the monitor, using the alternate RF technology and the address of the monitor, a message which contains the tag's ID but which does not contain the monitor's unique ID that was detected by the tag. The monitor may append its own ID before transmitting a message containing both to the network access point 12. That is, the monitor can infer that its own ID should be included in the location data sent to the server from the fact that the tag has sent the tag's own ID to that particular monitor.

Figure 2:
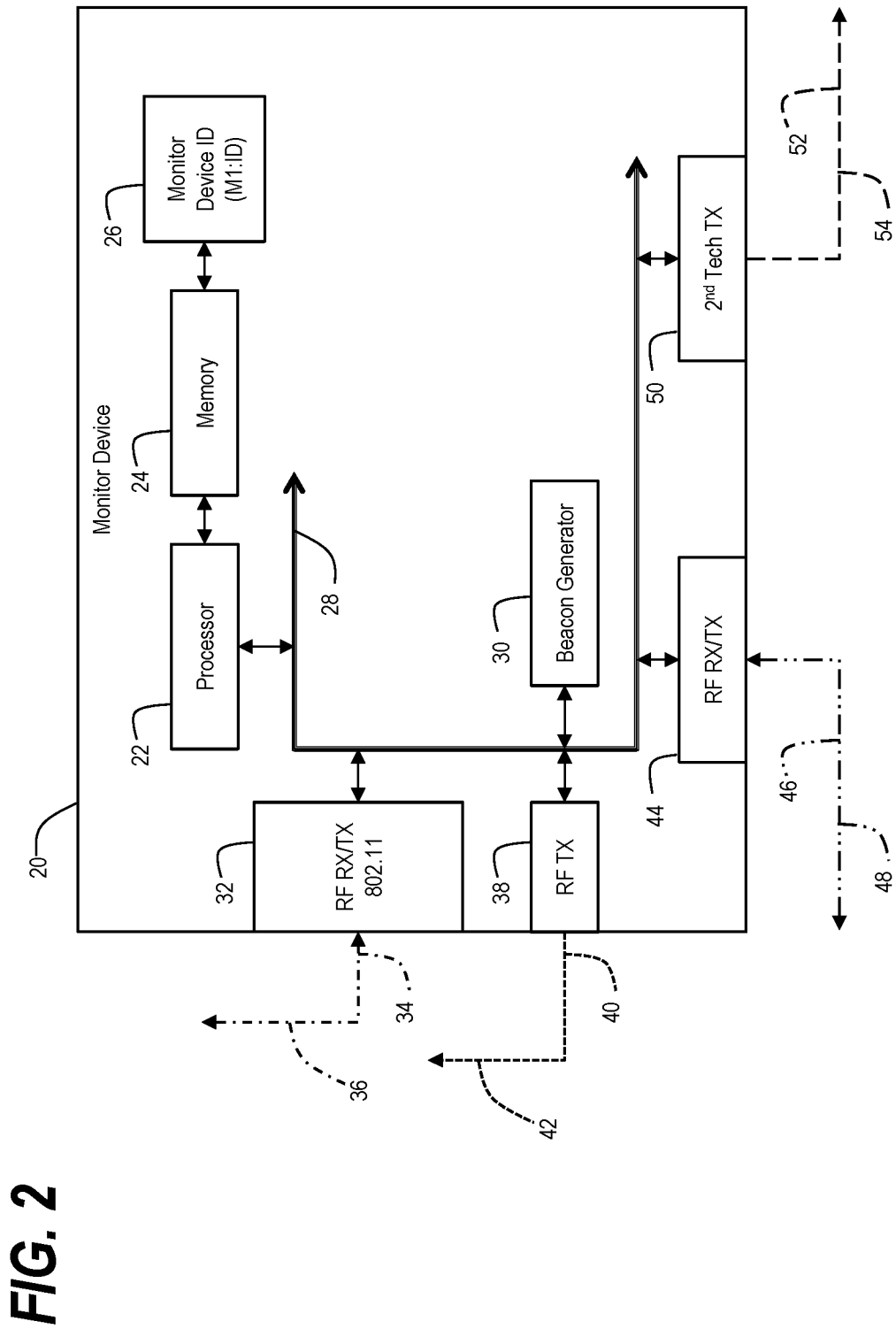
FIG. 2 illustrates a schematic diagram of a monitor device used within the hybrid real-time location system of FIG. 1.

Referring now to FIG. 2, a schematic diagram is shown of the monitor device (20) used within the real-time location system (1) of FIG. 1. The monitor device (20) includes a monitor device central processor (22) in communication with a monitor device memory (24) that accesses a monitor device ID value (26), e.g., "M1:ID," that uniquely identifies the particular monitor device (20).

The monitor device central processor (22) may communicate with other monitor device (20) components via a monitor device communication bus (28) such as an monitor device network AP RF transceiver (32) that receives and generates RF network AP device signals (34) having a particular RF network AP device signal protocol (36).

The monitor device central processor (22) further communicates via the monitor device communication bus (28) with a beacon generator (30), and a beacon RF transmitter (38) that generates RF beacon signals (40) based on the beacon generator (30) and according to an RF beacon signal protocol (42). The RF beacon signals (40) carry the monitor device ID value (26) and time stamps to allow the portable tags (60) to find a monitor device to transmit a corresponding RF portable tag signal (72) to.

The monitor device central processor (22) further communicates via the monitor device communication bus (28) with a monitor device RF transceiver (44) that receives and/or transmits RF monitor device signals (46), for example, to and from the portable tags. Note that the monitor device network AP RF transceiver (32), the beacon RF transmitter (38) and the monitor device RF transceiver (or receiver) (44) may all be a single physical transceiver transmitting and/or receiving at different respective frequencies and protocols. For example, the monitor device RF transceiver (44) may transmit to a portable tag at a proprietary (900 MHz) protocol, and receive location data or measurement signals from the tag on a BLE protocol and frequency, and/or visa versa.

The monitor device central processor (22) further communicates via the monitor device communication bus (28) with a secondary technology medium transmitter (50) that transmits secondary technology medium signals (52) (US or IR, for example) according to a secondary technology medium signal protocol (54).

Figure 3:
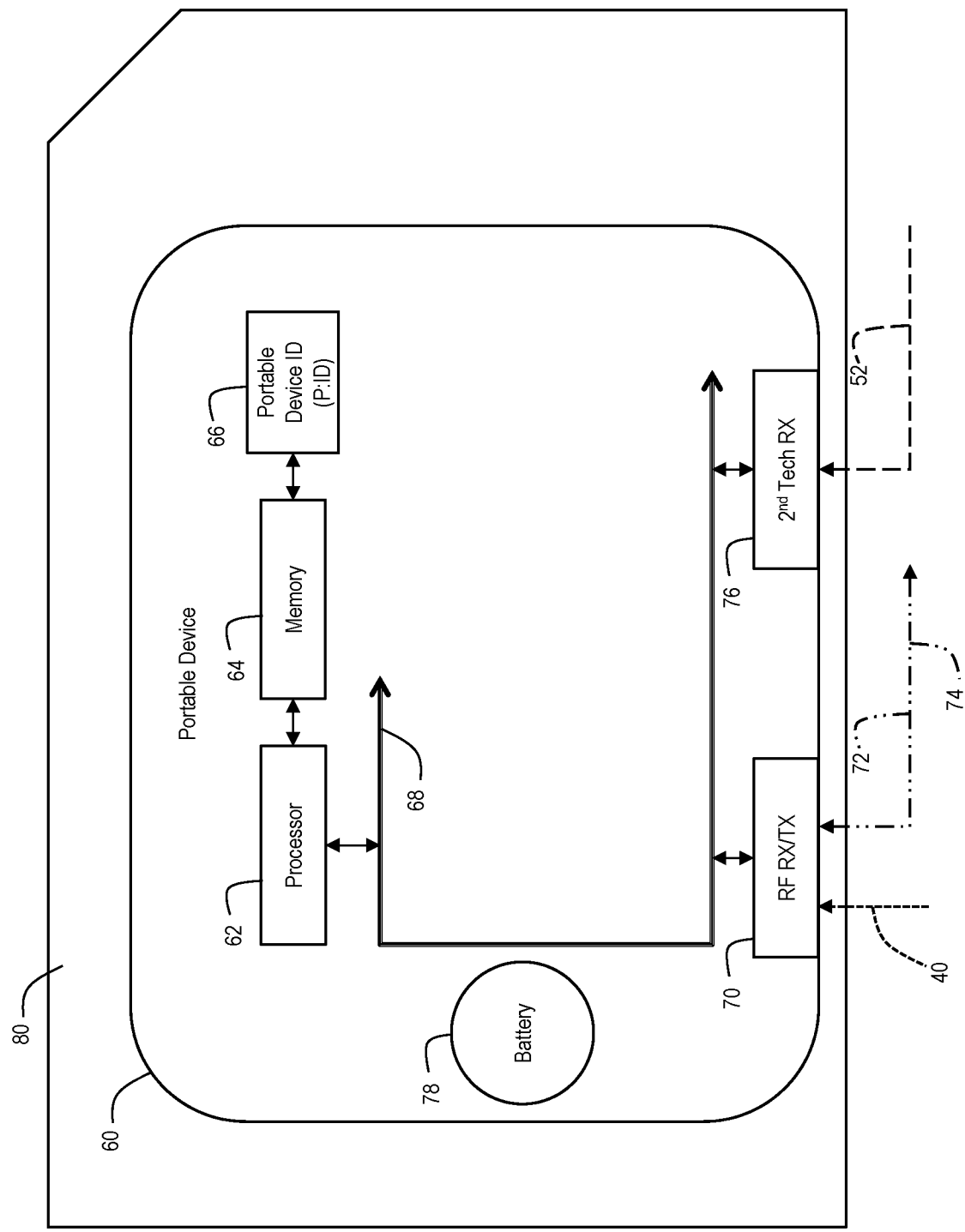
FIG. 3 illustrates a schematic diagram of a portable tag used within the hybrid real-time location system of FIG. 1.

Referring now to FIG. 3, a schematic diagram is shown of a portable tag (60) used within the real-time location system (1) of FIG. 1. Portable tag (60) may be provided for persons or apparatuses (80) to which it may be attached, and includes a portable tag central processor (62) in communication with a portable tag memory (64) that accesses a portable tag ID value (66), e.g., "P:ID," that uniquely identifies that particular portable tag (60).

The portable tag central processor (62) communicates via a portable tag communication bus (68) such as portable tag RF transceiver (70) that receives and generates RF portable tag signals (72) having a particular RF portable tag signal protocol (74) using the alternate RF technology. The portable tag RF transceiver (70) may also receive RF beacon signals (40) from the beacon RF transmitter (38) of the monitor device (20). The portable tag may communicate to one or more monitors using different protocols or frequencies from those used to receive RF signals from the monitors.

The portable tag central processor (62) further communicates via the monitor device communication bus (28) with a secondary technology medium receiver (76) that receives secondary technology medium signals (52) from the secondary technology medium transmitter (50) of the monitor device (20), (see FIG. 2). The portable tag (60) is powered by the portable tag power supply (78), for example, a self-contained, interchangeable/rechargeable battery cell.

Figure 4:
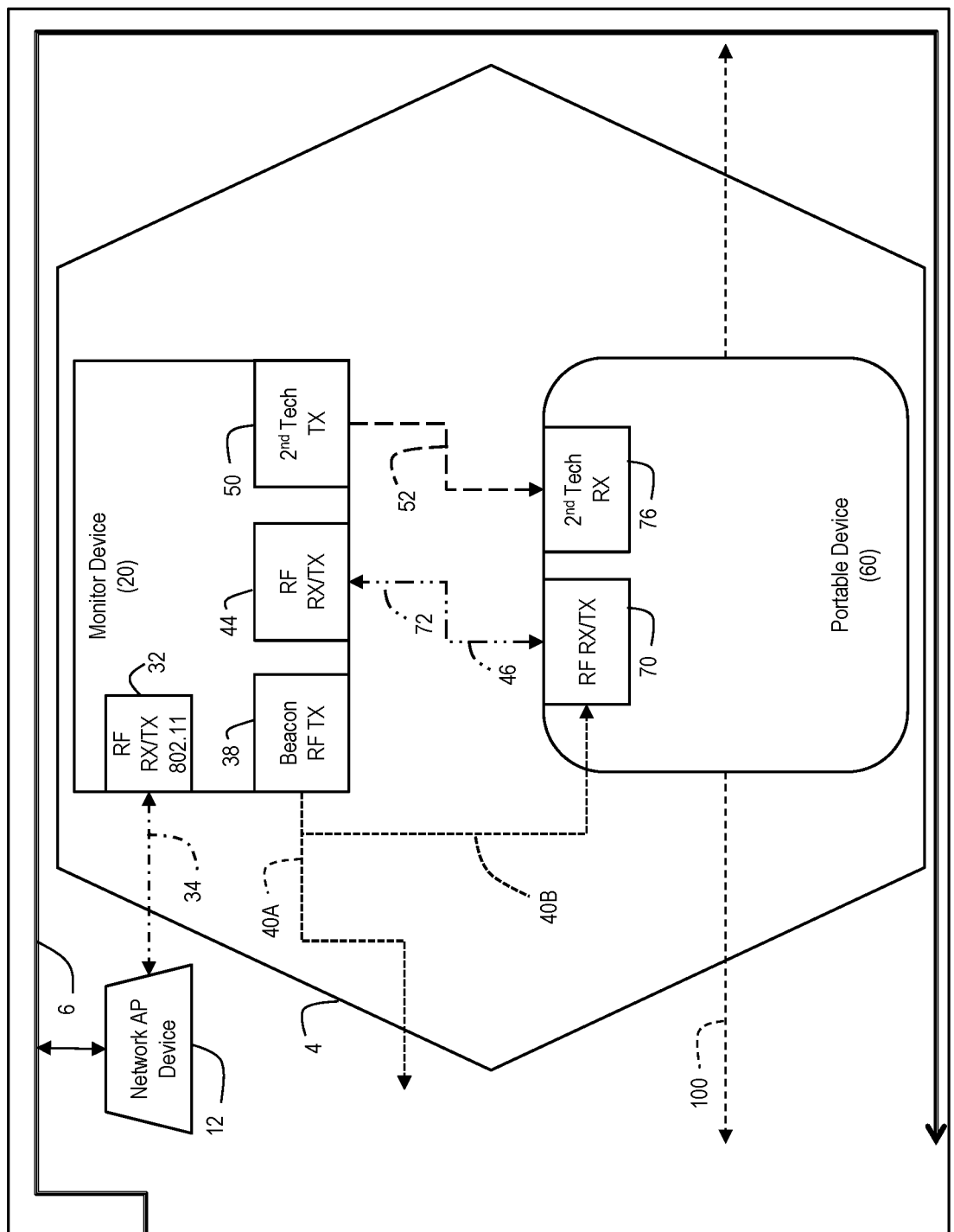
FIG. 4 illustrates a schematic diagram of communication signal paths and types between the portable tag of FIG. 3 and the monitor device of FIG. 2 within the hybrid real-time location system of FIG. 1.

Referring now to FIG. 4, a schematic diagram is shown of communication signal paths and signal types between the portable tag (60) of FIG. 3 and the monitor device (20) of FIG. 2 within the real-time location system (1) of FIG. 1. When a portable tag (60) moves along a path (100) into the range of the monitor device (20) within a location (4) of the facility (2), the portable tag (60) identifies and receives a secondary technology medium signal (52) at the secondary technology medium receiver (76) transmitted from the secondary technology medium transmitter (50).

The portable tag (60) then transmits a corresponding RF portable tag signal (72) via the portable tag RF transceiver (70) to the monitor device RF transceiver (44). This signal is preferably the above referenced location data. Thereafter, the monitor device (20) transmits the location data to the network AP device (12), which communicates the location data via the backbone communication network (6) to the real-time location system server (8).

Communications from the monitor device (20) to the network AP device (12) can be in the form of 1-D directional efficient transmissions in the form of, or similar to, CCX, (the CCX, non-associated mode protocol), or alternatively, can use an associated mode of communication. In one variation of the current embodiment, the monitor device (20) transmits a CCX packet for every packet received by the monitor device RF transceiver from the portable tag (60). In order to improve efficiency, the monitor device (20) may combine several of the received RF packets received from the portable tag (60) and load them into a single CCX packet. For example, the monitor may transmit to the network access point at fixed or variable time intervals, or after every nth packet. It can also combine the two, for example, forwarding a single transmission after X time, unless prior to that time at least N tags have reported their location data, in which case, a transmission from the monitor to the access point is made upon receipt of the Nth location data packet received from the portable tag. This increases the latency, but improves efficiency.

In another embodiment, the monitor device uses a WiFi (802.11-type) associated mode for communication with the network AP device 12. Using the associated mode allows a much larger load in a single packet when compared with, for example, CCX.

The portable tag (60) in other communication embodiments may receive RF monitor device signals (46) directly to the portable tag RF transceiver (70) transmitted from the monitor device RF transceiver (44). This signal path may occur when the portable tag (60) is out of range of the secondary technology medium transmitter (50) of a corresponding monitor device (20), as discussed below.

The beacon generator (30) of FIG. 2 may transmit, via a beacon RF transmitter (38), an RF beacon signal (40A) at, for example, regular intervals to any portable tags (60) within RF range of the monitor device (20). Such RF beacons are preferably, for example, BLE or other non-Wifi beacons, or they may be of the Wifi type.

Figure 5:
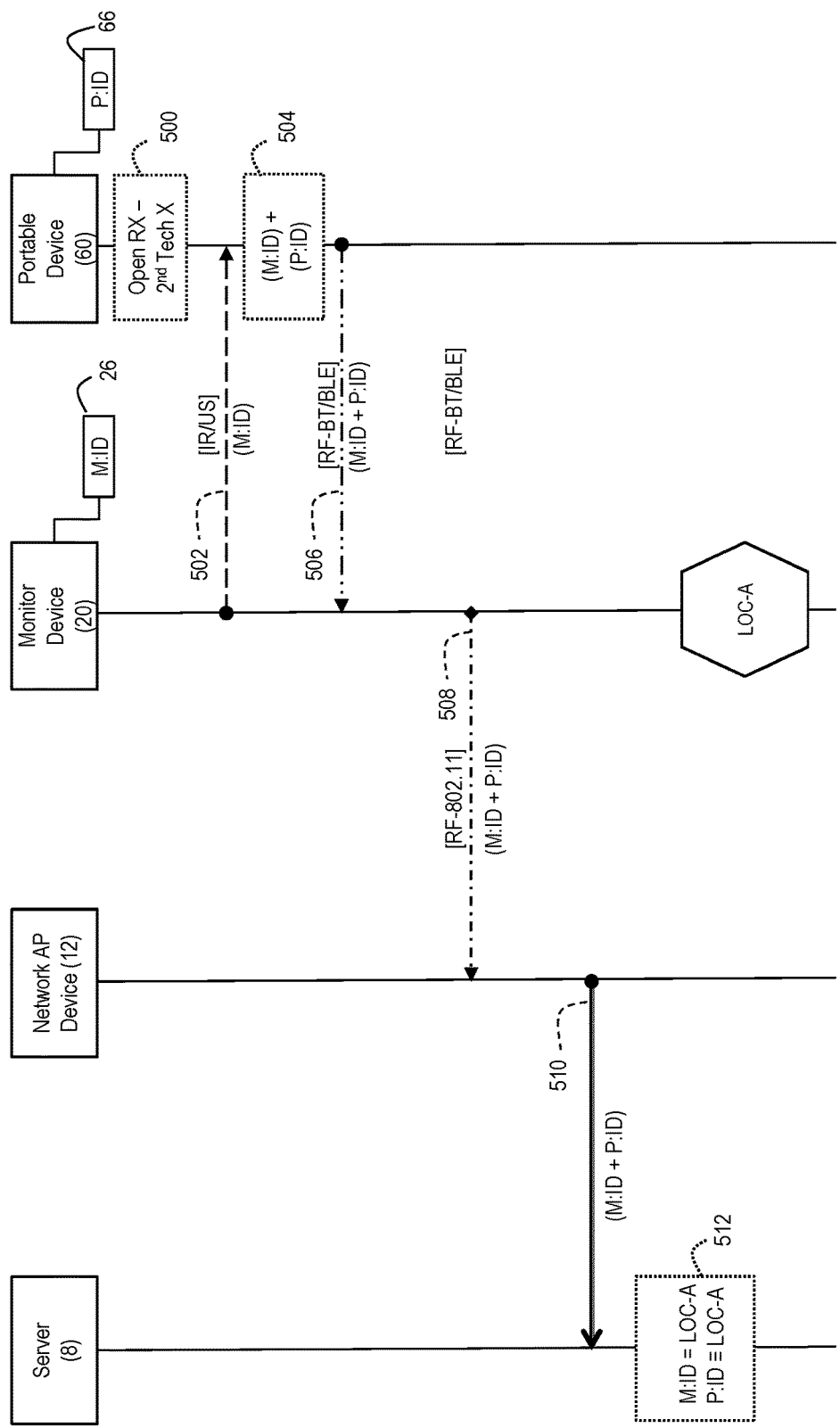
FIG. 5 illustrates a first embodiment of a communication path diagram between the portable tag of FIG. 3, the monitor device of FIG. 2, and the network access point and server of the hybrid real-time location system of FIG. 1.

Referring now to FIG. 5, a first embodiment of a communication path diagram is shown between the portable tag (60) of FIG. 3, the monitor device (20) of FIG. 2, and the network AP device (12) and real-time location system server (8) of the real-time location system (1) of FIG. 1.

The portable tag (60) may open (500) its secondary technology medium receiver (76) to receive any secondary technology medium signals (52) sent from any monitor device (20) within range of the portable tag (60). Periodically, a secondary technology medium signal (52) is transmitted (502) from the monitor device RF transceiver (44) that includes the specific monitor device ID value (26), (e.g., M:ID). Accordingly, the monitor device RF transceiver (44) opens its receiver for a limited time window after it transmits the monitor device ID value (26) in order to receive transmissions from the portable tag 60.

When the secondary technology medium signal (52) with the monitor device ID value (26), (e.g., M:ID), is received at the secondary technology medium receiver (76), the portable tag (60) concatenates its own portable tag ID value (66), (e.g., P:ID) with the monitor device ID value (26), (e.g., M:ID), and transmits (506) an RF portable tag signal (72) via the portable tag RF transceiver (70) according to the alternate RF technology (74) to the monitor device RF transceiver (44) of the monitor device (20). The portable tag (60) transmits the RF portable tag signal (72) within the known limited time window to allow reception by the monitor device (20). The time window can be set by the monitor device (20) to be immediately after the portable tag's (60) reception of the secondary technology medium signal (52), or any time thereafter. This way the power consumption of the portable tag RF transceiver (70) is limited to a minimum. The time window length may depend on the expected number of active portable tags transmitting to any number of monitor devices (20).

In order to increase the likelihood of reception by the targeted monitor device (20), the portable tag transmission relative to the secondary technology medium signal (52) transmission time may made random but still within the time window set by the monitor device (20).

After receiving the RF portable tag signal (72) with the concatenated monitor device ID value (26) and portable tag ID value (66), (e.g., M:ID+P:ID), the monitor device (20) further transmits (508) an RF network AP device signal (34) with the concatenated monitor device ID value (26) and portable tag ID value (66) via the monitor device network AP RF transceiver (32) by a corresponding RF network AP device signal protocol (36) to the network AP device (12). Equivalently, the location data is sent via, for example, Wifi, from the monitor to the AP device (12).

The network AP device (12) after receiving the concatenated monitor device ID value (26) and portable tag ID value (66) from the monitor device (20) forwards the information via the backbone communication network (6) to the real-time locations system server (8), where the server (8) associates (512) the location of the portable tag (60) with the particular portable tag ID value (66) with the location, (e.g., LOC-A), that is stored in the real-time location system server (8) being associated with the particular monitor device ID value (26) of the monitor device (20).

Figure 6:
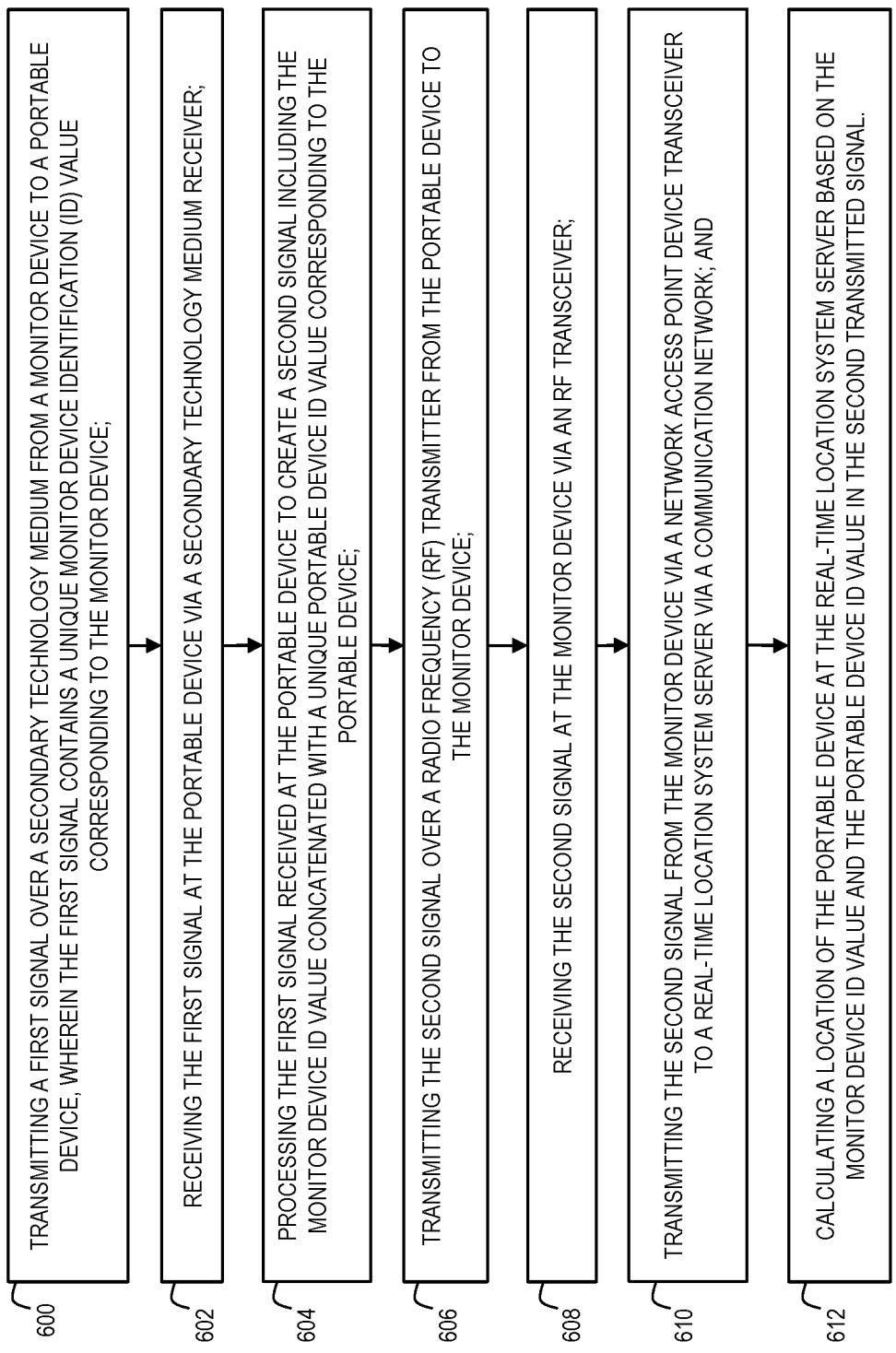
FIG. 6 illustrates a logic flow chart of the first embodiment of a method of communicating between the devices of the hybrid real-time location system from FIGS. 1-5.

A flow chart showing an exemplary operation of the above system is depicted in FIG. 6.

Figure 7:
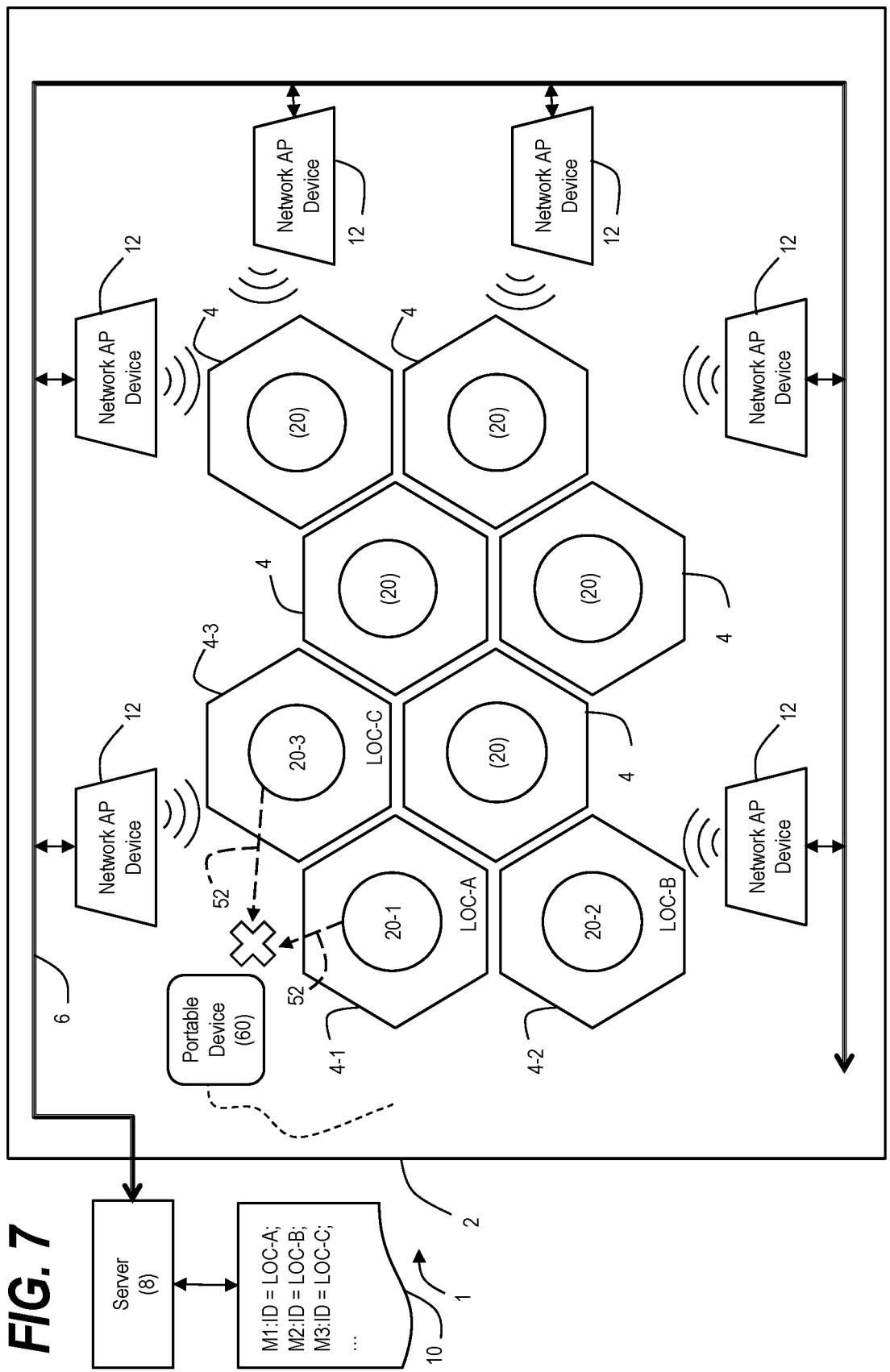
FIG. 7 illustrates a schematic diagram of the hybrid real-time location system of FIGS. 1-4 for a second embodiment of communication between the portable tag of FIG. 3 and the server, where the portable tag does not initially receive any secondary technology signals from any monitor device.
Figure 8:
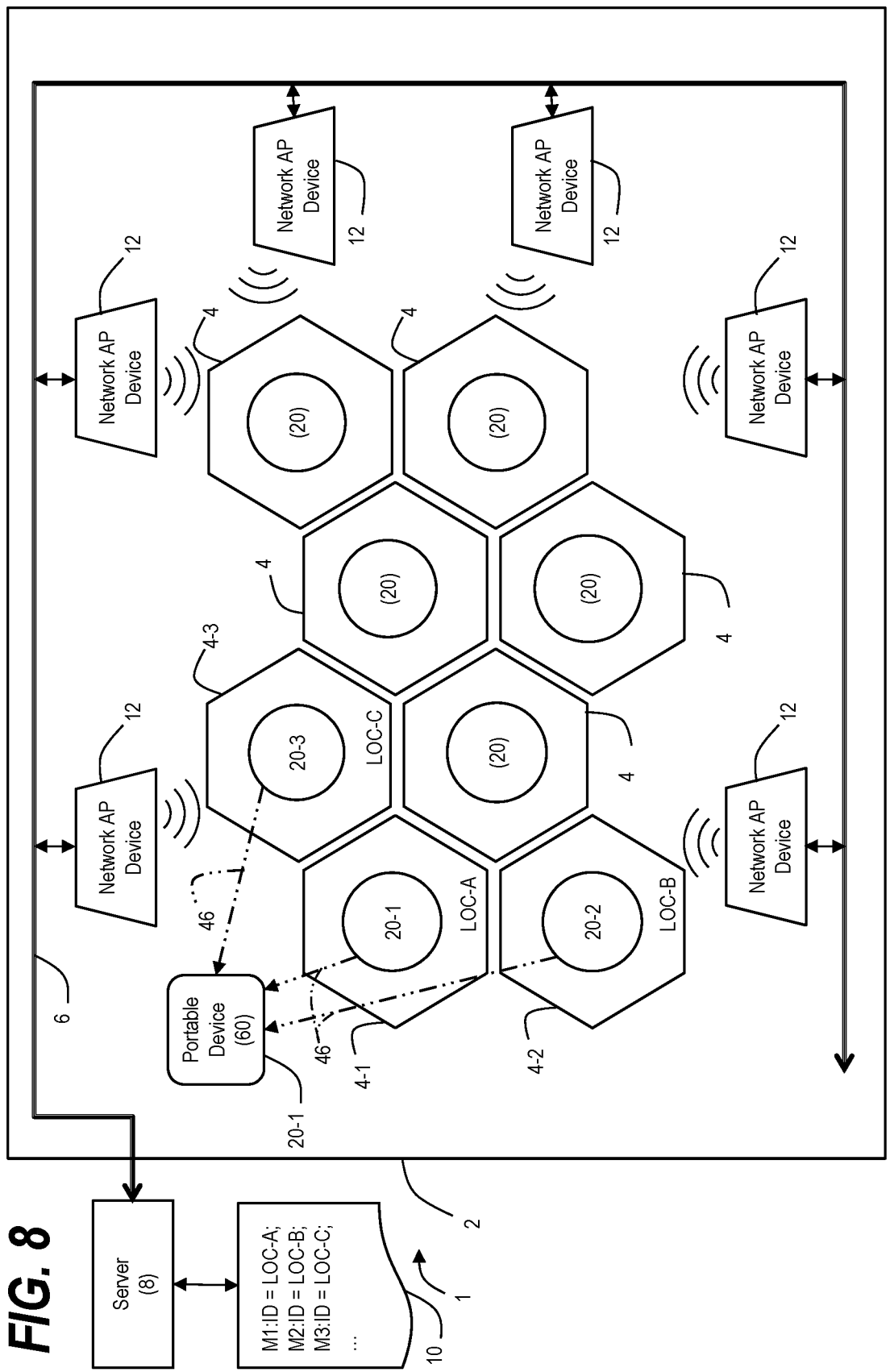
FIG. 8 illustrates a schematic diagram of the hybrid real-time location system of FIGS. 1-4 for a second embodiment of communication between the portable tag of FIG. 3 and the server, where the portable tag receives and stores received signal strength indications from adjacent monitor devices.
Figure 9:
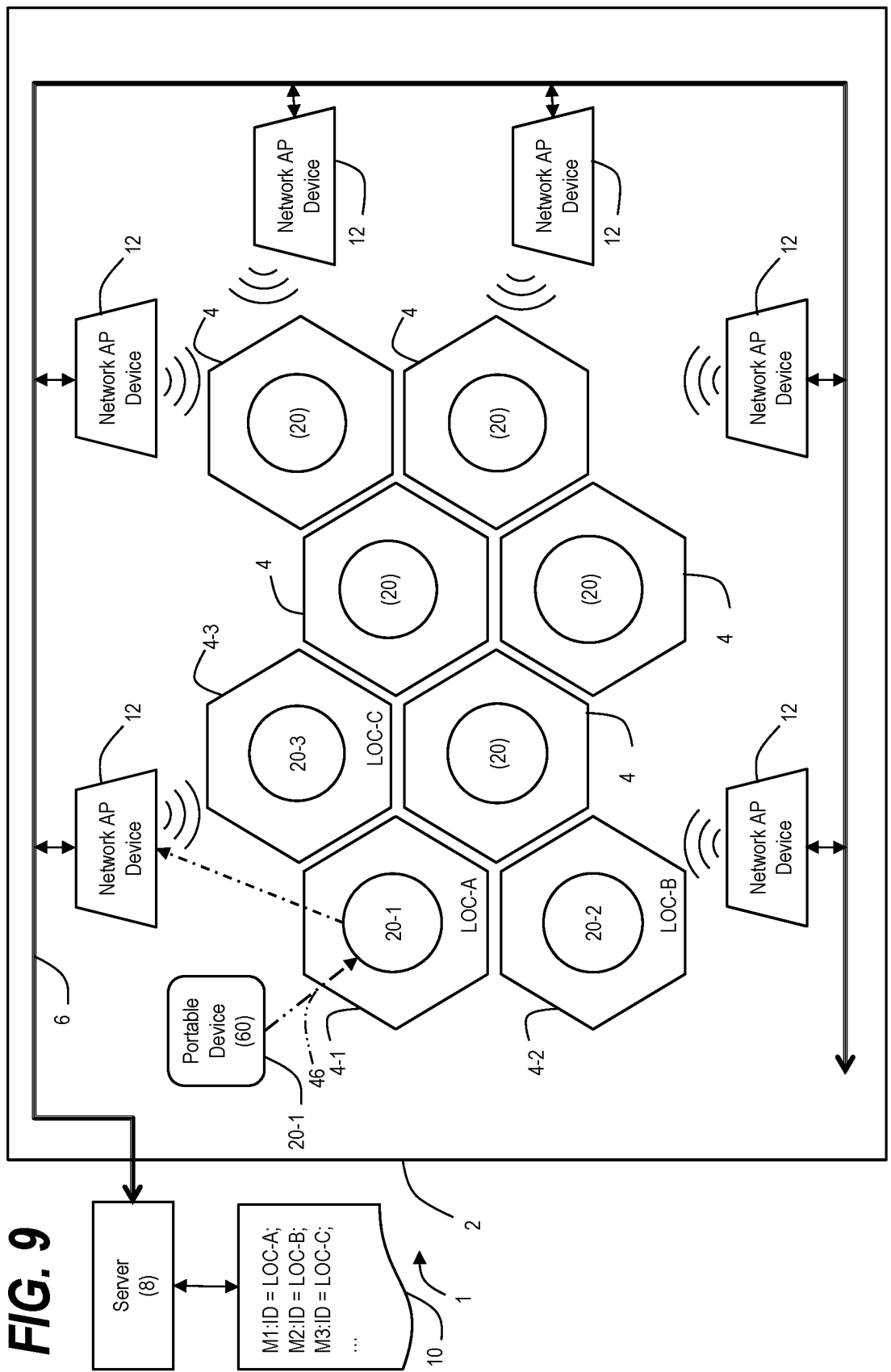
FIG. 9 illustrates a schematic diagram of the hybrid real-time location system of FIGS. 1-4 for a second embodiment of communication between the portable tag of FIG. 3 and the server, where the portable tag transmits the received signal strength indications received from adjacent monitor devices to an adjacent monitor device to be further transmitted to the server via a network access point device.

Referring now to FIGS. 7-9, a sequence of schematic diagrams shows the hybrid real-time location system of FIGS. 1-4 for a second embodiment of communication between a representative portable tag (60) of FIG. 3 and the real-time location system server (8), when the portable tag (60) does not initially receive any secondary technology signals for any monitor device (20).

Referring to FIG. 7, this schematic diagram illustrates the portable tag (60) not receiving any secondary technology medium signals (52) from any adjacent monitor device (e.g., 20-1, 20-3). This situation may occur, for example, when the portable tag (60) is outside of a range of any secondary technology signals from any monitor devices (20), or may occur when a secondary technology medium transmitter (50) of a monitor device (20) fails to transmit any secondary technology medium signals (52), either by fault or by design. Most often, this situation will occur if the portable tag is in a hallway or other location that represents an area that does not have proper coverage for the secondary technology. For example, if the secondary technology is IR, the portable tag may not have line of sight to the monitor and may thus not receive the monitor ID in the secondary technology.

Referring to FIG. 8, this schematic diagram illustrates the portable tag (60) of FIG. 3 opening its portable tag RF transceiver (70) to scan and receive any RF beacon signals (40) being transmitted by any adjacent monitor devices, (e.g., 20-1, 20-2 and 20-3) from their respective monitor device RF transceivers (44). The RF beacon signals (40) are high rate-type signals, (such as BLE beacons), that allow the portable tag (60) to quickly find a target monitor device (20) and spend as little time as possible with an open or scanning portable tag RF transceiver (70). These received RF beacon signals (40) each include the respective monitor device ID value (26) for each monitor device (20). The portable tag (60) then stores the received RF beacon signals (40) with, for example, each of their associated RSSI values (and monitor device ID values (26).

Referring to FIG. 9, this schematic diagram illustrates the portable tag (60) of FIG. 3 transmitting an RF signal (40) including all the received RSSI values and associated monitor device ID values (26) to a target monitor device, (e.g., 20-1), that either had the strongest RSSI value at the portable tag (60), or the monitor device that was found first by the portable tag (60). The target monitor device (20-1) then forwards the RF signal containing all the received RSSI values and associated monitor device ID values (26) via the monitor device network AP RF transceiver (32) to the network AP device (12), which in turn forwards the information to the real-time location system server (8) via the backbone communication network (6).

Once all the received RSSI values and associated monitor device ID values (26) are received by the real-time location system server (8), the server calculates a location of the portable tag (60) based on trilateration of values of each of the RSSI values given the known positions (e.g., LOC-A, LOC-B, LOC-C) of the particular monitor devices (20-1, 20-2, 20-3), respectively, based on the associated monitor device ID values (26).

Figure 10:
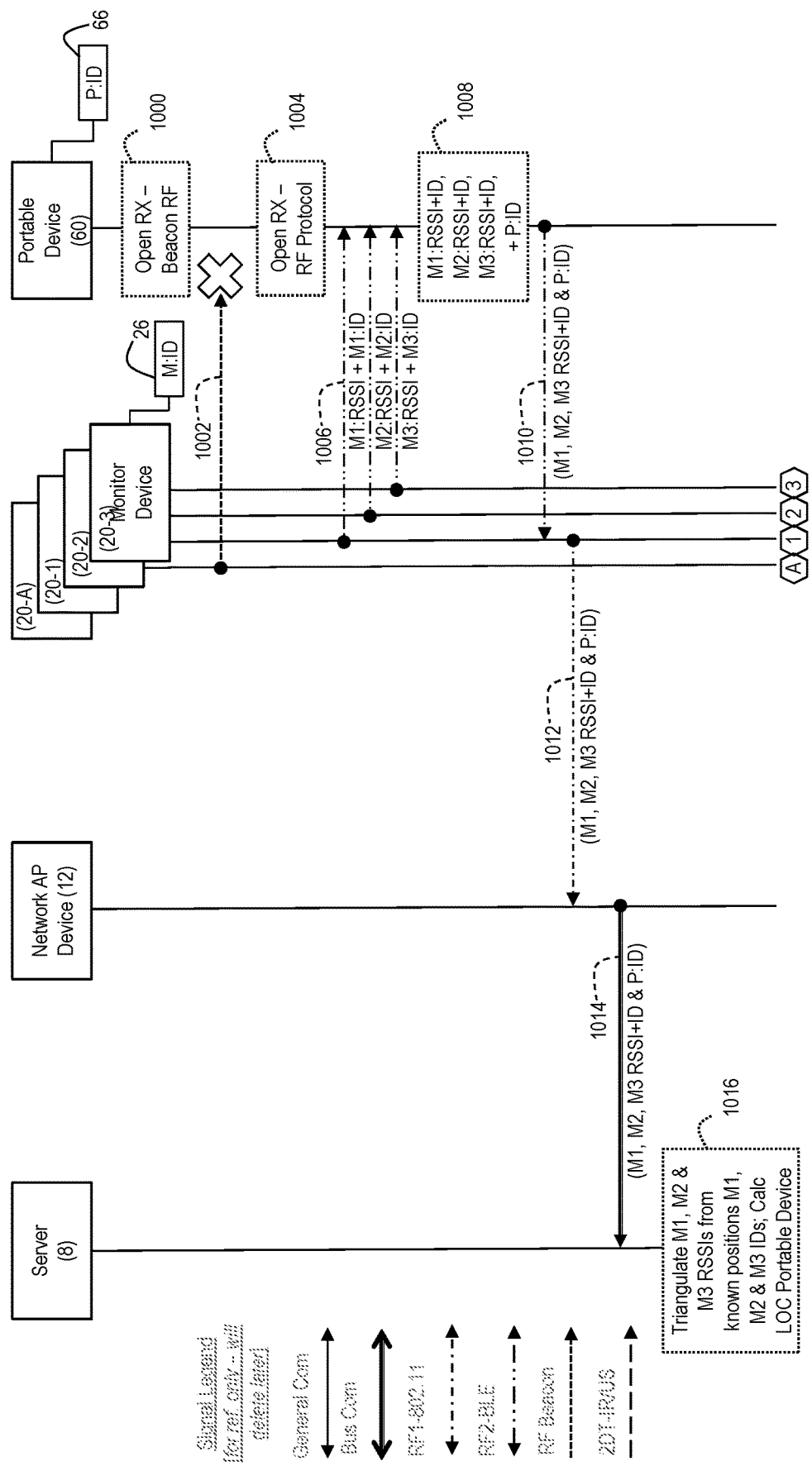
FIG. 10 illustrates the second embodiment of a communication path diagram regarding FIGS. 7-9 between the portable tag of FIG. 3, the monitor device of FIG. 2, and the network access point and server of the hybrid real-time location system of FIG. 1.

Referring now to FIG. 10, the second embodiment of FIGS. 7-9 is illustrated in a communication path diagram between a portable tag (60) of FIG. 3, a plurality of monitor devices (20) of FIG. 2, the network AP device (12), and the real-time location system server (8) of the hybrid real-time location system of FIG. 1.

The portable tag (60) opens (1000) its secondary technology medium receiver (76) expecting to receive any secondary technology medium signals (52) transmitted from any adjacent monitor device, (e.g., monitor device 20-A), in FIG. 10. However, in this second embodiment, the portable tag (60) fails to receive (1002) any such secondary technology medium signals (52) from the adjacent monitor device (20-A).

The portable tag (60) thereafter opens (1004) its portable tag RF transceiver (70) to receive any RF beacon signals (40) from nearby monitor devices, (e.g., 20-1, 20-2 and 20-3). Each RF beacon signal (40) includes a respective monitor device ID value (26), (e.g., M1:ID, M2:ID and M3:ID) when it is received by the portable tag (60). The portable tag records 1008, for each received RF beacon signal (40), the RSSI in addition to the associated monitor device ID value (26), and concatenates its own portable tag ID value (66), (e.g., P:ID), to the received RF beacon signals (40).

Thereafter, the portable tag (60) transmits (1010) a signal containing the RSSI values, the respective monitor ID values (26), and its own portable tag ID value (66) via the portable tag RF transceiver (70) to a target monitor device, (e.g., 20-1), that had the strongest RSSI value, or which was otherwise selected from the plural monitor devices from which a beacon was received. After the signal is received by the target monitor device (20-1), the information is forwarded (1012) via the respective monitor device network AP RF transceiver (32) to the network AP device (12). The network AP device (12) then transmits (1014) the information to the real-time location system server (8) via the backbone communication network (6).

Once all the received RSSI values and associated monitor device ID values (26) are received by the real-time location system server (8), the server calculates a location of the portable tag (60) based on trilateration of values of each of the RSSI values given the known positions (e.g., location 1, 2 and 3) of the particular monitor devices (20-1, 20-2, 20-3), respectively, based on the associated monitor device ID values (26).

An alternative embodiment to the embodiment illustrated in FIG. 10 may further include, in a scenario when the portable tag is outside of the range of the secondary technology medium transmitter (50) of the monitor device (20), multiple monitor devices (20), (for example, the monitor devices (20) in FIGS. 7-9), may receive the RF portable tag signal (72) of the portable tag (60). These same monitor devices (20) then report the RSSI values of the received RF portable tags signal (72) to the real-time location system server (8) via the network AP devices (12) and the backbone communication network (6), where the real-time location system server (8) uses the RSSI values to calculate the location of the portable tag (60) by trilateration.

Referring now to FIG. 11, a logic flow chart is shown of the second embodiment of a method of communicating between the devices of the hybrid real-time location system from FIGS. 7-10.

A portable tag (60) opens (1100) a secondary technology medium receiver (76) to detect secondary technology medium signals (52) transmitted from any of a plurality of local monitor devices (20). The portable tag then determines (1102) the undetectability of any secondary technology medium signals (52) corresponding to the any of the plurality of local monitor devices (20). As a result of determining the undetectability of the any secondary technology medium signals (52), scanning (1104), via the portable tag RF transceiver (70) of the portable tag (60), for at least three detectible RF beacon signals (40) transmitted from at least three corresponding respective monitor devices (20).

The portable tag (60) records (1106) a Received Signal Strength Indicator (RSSI) value corresponding to each of the at least three detectible RF beacon signals (40). The portable tag then transmits (1108) to a target monitor device (20), the RSSI of each of the at least three detectible RF beacon signals.

Many variations of the above described embodiments may be implemented. For example, the tag may be programmed or otherwise configured to first check for the secondary technology, and then, if unavailable within a prescribed time, revert to scanning for beacons and using RSSI measurements.

In another embodiment, if the tag detects the monitor ID in the secondary technology, it may transmit the location data back to plural monitors instead of only one monitor. Alternatively, the tag may transmit the location data back to one or more monitors, however, if it is using the beacon location method described above, may transmit the beacon measurements (e.g.; RSSI) to plural monitors or to one or more monitors that are different from the monitors to which the location data is transmitted when the secondary technology is detected. Moreover, one or more of the monitors may transmit either location data or RSSI or other beacons measurements received from one or more portable tags to the network access points.

In still another variation, the secondary technology can be multiplexed to increase capacity. For example, the US or IR transmitters in different operating wavelengths/frequencies or may be time or code division multiplexed.

Although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A real-time location system comprising:
a backbone network having access points and a server;
a plurality of monitors mounted at locations around a facility, each monitor configured to transmit a unique location code using a secondary transmission technology, said location code being mapped to a location in a facility at which said monitor is mounted;
at least one tag having a tag ID, said tag being configured to receive a location code and to transmit said tag ID back to at least one of said monitors using an alternative RF technology;
wherein said monitor is also configured to receive and forward said tag ID to at least one of said access points using a first RF protocol other than the alternative RF technology; and
wherein the first RF protocol is compliant with an 802.11 standard and the alternative RF technology uses a shorter-range protocol; and
wherein said monitors are further configured to transmit RF beacons using a second RF protocol and said tags are further configured to receive the RF beacons from plural monitors and to retransmit, if said tag is not within range to detect said location code, to at least one of said monitors, information indicative of a power level of each of said received beacons or from which said power levels can be calculated.

2. The location system of claim 1 wherein the at least one of said monitors includes a monitor that transmitted the location code detected by said tag.

3. The location system of claim 1 wherein said tag also transmits its own tag ID back to a monitor using the alternative RF technology.

4. The location system of claim 1 wherein said RF beacons do not use said alternative RF technology protocol, but use a different RF protocol.

* * * * *